US009356518B2

(12) United States Patent
Chen et al.

(10) Patent No.: US 9,356,518 B2
(45) Date of Patent: May 31, 2016

(54) OVER-VOLTAGE PROTECTION CIRCUIT AND OVER-VOLTAGE PROTECTION METHOD

(71) Applicant: RICHTEK TECHNOLOGY CORP, Hsinchu (TW)

(72) Inventors: An-Tung Chen, Hsinchu (TW); Li-Wen Fang, Hsinchu (TW); Chih-Hao Yang, Hsinchu (TW)

(73) Assignee: RICHTEK TECHNOLOGY CORP, Hsinchu (TW)

( * ) Notice: Subject to any disclaimer, the term of this patent is extended or adjusted under 35 U.S.C. 154(b) by 0 days.

(21) Appl. No.: 14/529,111

(22) Filed: Oct. 30, 2014

(65) Prior Publication Data

US 2016/0043627 A1 Feb. 11, 2016

(30) Foreign Application Priority Data

Aug. 7, 2014 (TW) .............................. 103127078 A (51) Int. Cl.
*H02M 3/158* (2006.01)
*H02M 1/32* (2007.01)
*H02M 1/00* (2006.01)

(52) U.S. Cl.
CPC .... *H02M 3/1584* (2013.01); *H02M 2001/0045* (2013.01)

(58) Field of Classification Search
CPC ...... H02M 3/158; H02M 3/1582; H02M 1/32
USPC .................................. 323/271, 280, 282, 285
See application file for complete search history.

(56) References Cited

U.S. PATENT DOCUMENTS

| 7,952,900 | B2* | 5/2011 | Tomiyoshi | H02M 3/1582 363/132 |
|---|---|---|---|---|
| 2002/0130645 | A1* | 9/2002 | Tsai | G05F 1/24 323/274 |
| 2008/0012542 | A1* | 1/2008 | Liu | H02M 3/158 323/271 |
| 2009/0045788 | A1* | 2/2009 | Williams | H02M 1/32 323/273 |
| 2009/0160412 | A1* | 6/2009 | Latham | H02M 3/1588 323/282 |
| 2010/0123978 | A1* | 5/2010 | Lin | H02H 7/1213 361/18 |
| 2011/0001461 | A1* | 1/2011 | Lu | H02J 7/0031 323/283 |
| 2011/0267015 | A1* | 11/2011 | Lu | H03M 3/1588 323/235 |
| 2012/0229110 | A1* | 9/2012 | Huang | H02M 3/1582 323/282 |
| 2014/0152274 | A1* | 6/2014 | Lee | G05F 1/595 323/271 |

* cited by examiner

*Primary Examiner* — Timothy J Dole
*Assistant Examiner* — Sisay G Tiku
(74) *Attorney, Agent, or Firm* — Chun-Ming Shih (57) ABSTRACT

An over-voltage protection circuit is applied to a switching voltage converting circuit. The switching voltage converting circuit manipulates an upper bridge power switch in the circuit, so as to convert an input voltage into an output voltage by an inductor. A channel of the upper bridge power switch and the inductor are coupled to a phase end. The over-voltage protection circuit includes: a comparator, coupled to the switching voltage converting circuit, wherein when a voltage of the phase end is higher than a voltage limiting threshold, an output end of the comparator outputs a first voltage level; and a pulse width detection unit, coupled to the output end of the comparator, wherein when the output end of the comparator remains the first voltage level for a time period longer than a protection period, the pulse width detection unit outputs an over-voltage protection activation signal.

16 Claims, 5 Drawing Sheets

OVER-VOLTAGE PROTECTION CIRCUIT AND OVER-VOLTAGE PROTECTION METHOD

CROSS REFERENCE TO RELATED APPLICATIONS

This non-provisional application claims priority claim under 35 U.S.C. §119(a) on Patent Application No. 103127078 filed in Taiwan, R.O.C. on Aug. 7, 2014, the entire contents of which are hereby incorporated by reference herein.

BACKGROUND

1. Technical Field

This disclosure relates to an over-voltage protection circuit and an over-voltage protection method, and in particular, to an over-voltage protection circuit and an over-voltage protection method that can effectively prevent false operation of an upper bridge power switch.

2. Related Art

A switching voltage converting circuit is a voltage converting circuit. The switching voltage converting circuit manipulates, in a manner of switching a power switch, energy stored in an inductive element to supply the energy to an output load and converts an input voltage into an output voltage at an output end, so as to maintain a fixed output voltage value, and provide a load current required by the output load. The switching voltage converting circuit has high conversion efficiency, and therefore can decrease unnecessary heat generation, thereby reducing complexity on the heat dissipation design.

However, a power element in the switching voltage converting circuit often has to directly bear a high voltage, thereby possibly causing damage to the power element. In an application, in which high voltage input is converted into low voltage output, of the switching voltage converting circuit, usually, because an upper bridge power element directly bearing a high voltage is damaged, a channel thereof short-circuits, so that an output end directly bears a high voltage of the input end. In some power supply applications, a load connected to the output end is quite expensive component such as a central processing unit or an application processor. As a result, if power supply units of these components do not have an over-voltage protection mechanism, direct damage will be easily caused, thereby increasing maintenance costs.

As described above, because an upper bridge power switch directly bears the input high voltage, damage is easily caused due to an inappropriate input voltage. In addition, wrong control over the upper bridge power switch also easily and directly incurs an over-voltage threat on other circuit sections. Therefore, how to provide an effective over-voltage protection mechanism for the upper bridge power switch becomes a significant problem in the over-voltage protection design of the switching voltage converting circuit.

SUMMARY

In order to solve the aforementioned problem, this disclosure provides an over-voltage protection circuit and an over-voltage protection method that can effectively prevent false operation of an upper bridge power switch.

This disclosure provides an over-voltage protection circuit, which is applied to a switching voltage converting circuit. The switching voltage converting circuit manipulates an upper bridge power switch in the circuit, so as to convert an input voltage into an output voltage by an inductor, and a channel of the upper bridge power switch and the inductor are coupled to a phase end. The over-voltage protection circuit includes: a comparator, coupled to the switching voltage converting circuit, where when a voltage of the phase end is higher than a voltage limiting threshold, an output end of the comparator outputs a first voltage level; and a pulse width detection unit, coupled to the output end of the comparator, where when the output end of the comparator remains the first voltage level for a time period longer than a protection period, the pulse width detection unit outputs an over-voltage protection activation signal.

In an embodiment of this disclosure, the comparator includes a positive input end and a negative input end, wherein the positive input end is coupled to the phase end, and the negative input end is coupled to a reference voltage; and when a voltage of the positive input end is higher than a voltage of the negative input end, the output end of the comparator outputs a first voltage level.

This disclosure further provides an over-voltage protection method, which is applied to a switching voltage converting circuit. The switching voltage converting circuit manipulates an upper bridge power switch in the circuit, so as to convert an input voltage into an output voltage by an inductor, and a channel of the upper bridge power switch and the inductor are coupled to a phase end. The over-voltage protection method includes the following steps: first, detecting whether a voltage of the phase end is higher than a voltage limiting threshold and has kept higher than the voltage limiting threshold for a time as long as a protection period; if yes, performing a next step; and then, activating an over-voltage protection mechanism.

In an embodiment of this disclosure, a step of detecting whether a voltage of the phase end is higher than a voltage limiting threshold is comparing, by using a comparator, whether the voltage of the phase end exceeds the voltage limiting threshold.

In an embodiment of this disclosure, a switching voltage converting circuit further includes a lower bridge power switch, and the over-voltage protection mechanism refers to that a channel of the lower bridge power switch is controlled to be conducted, and the channel of the lower bridge power switch 16 and the channel of the upper bridge power switch form a current loop.

In an embodiment of this disclosure, the current loop does not include an inductor.

In an embodiment of this disclosure, the current loop includes an inductor.

In an embodiment of this disclosure, the switching voltage converting circuit is a form of a buck switching voltage converting circuit or a buck-boost switching voltage converting circuit.

In an embodiment of this disclosure, the over-voltage protection mechanism refers to that an input voltage is turned off.

In this disclosure, An over-voltage protection circuit and an over-voltage protection method that are disclosed in this disclosure can directly detect, in a switching voltage converting circuit to which this disclosure is applied, a situation where an upper bridge power switch is possibly damaged, and further activate an effective over-voltage protection mechanism, so as to avoid damage of a load circuit that is driven by the switching voltage converting circuit.

The features, implementation and effects of the present creation are described in detail below with reference to the drawings and the optimal embodiments.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

In the specification and the subsequent patent application scope, the word "couple" herein refers to any direct and indirect electrical connecting manner. Therefore, if it is described in the context that a first apparatus is coupled to a second apparatus, it indicates that the first apparatus can be electrically connected to the second apparatus directly or can be electrically connected to the second apparatus indirectly by using other apparatuses or connecting manners.

Figure 1:
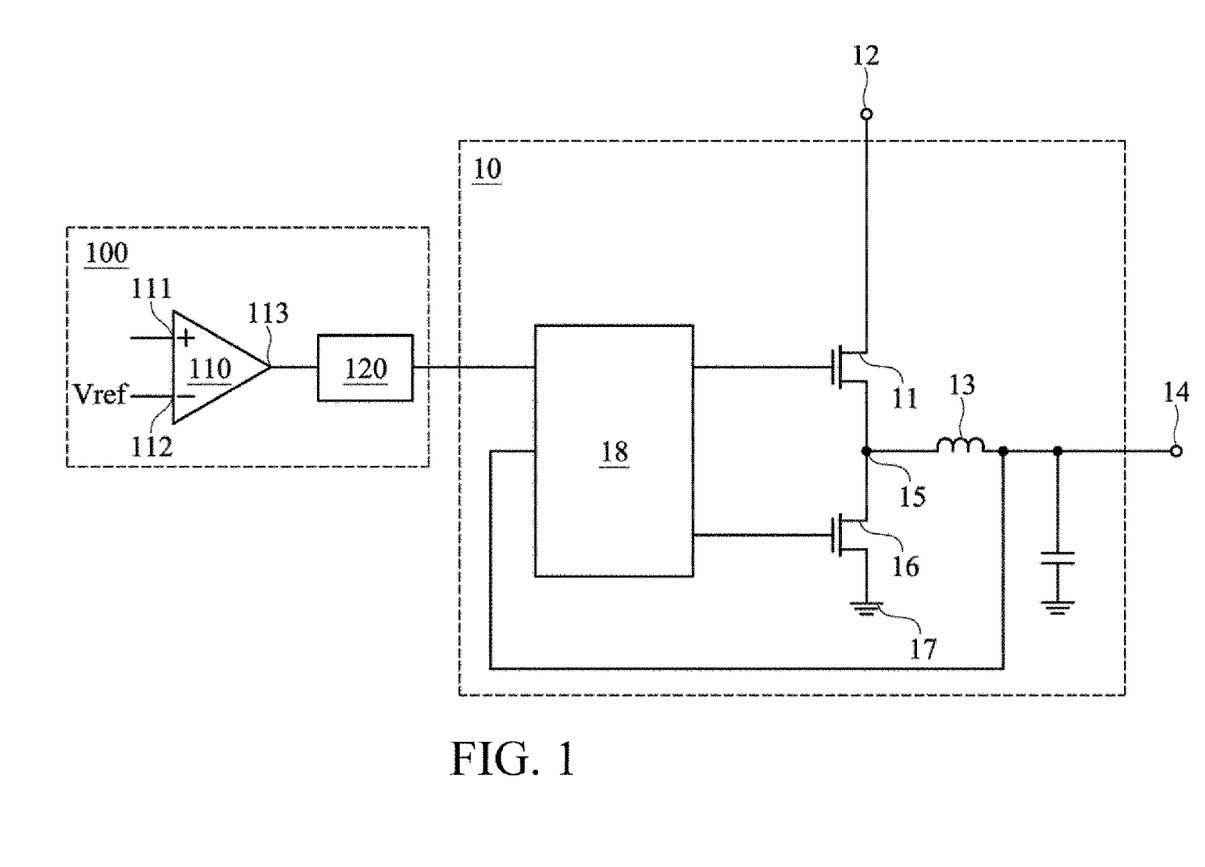
FIG. 1 is a circuit diagram of an over-voltage protection circuit and a buck switching voltage converting circuit to which the over-voltage protection circuit is applied according to an embodiment of this disclosure.

FIG. 1 is a circuit diagram of an over-voltage protection circuit 100 and a switching voltage converting circuit 10 to which the over-voltage protection circuit 100 is applied according to an embodiment of this disclosure. The switching voltage converting circuit 10 manipulates an upper bridge power switch 11 in the circuit, so as to convert an input voltage 12 into an output voltage 14 through an inductor 13. A channel of the upper bridge power switch 11 and the inductor 13 are coupled to a phase end 15. The over-voltage protection circuit 100 includes a comparator 110 and a pulse width detection unit 120.

The comparator 110 is coupled to the switching voltage converting circuit 10, and when a voltage of the phase end 15 is higher than a voltage limiting threshold, an output end 113 of the comparator 110 outputs a first voltage level. The pulse width detection unit 120 is coupled to the output end 113, and when the output end 113 remains the first voltage level for a time period longer than a protection period, the pulse width detection unit 120 outputs an over-voltage protection activation signal.

For further description, the over-voltage protection circuit 100 is used to perform detection. When due to damage of elements or an error on element control, the upper bridge power switch 11 causes the phase end 15 to be coupled to the input voltage 12, and then a voltage of the phase end 15 exceeds a voltage limiting threshold and remains this state for a time at least as long as a protection period, the over-voltage protection circuit 100 sends an over-voltage protection activation signal, to activate an over-voltage protection mechanism, for example, turn off the input voltage 12, or directly break the upper bridge power switch 11 to make the channel thereof disconnected. In an embodiment shown in FIG. 1, the comparator 110 includes a positive input end 111 and a negative input end 112, which are respectively coupled to the phase end 15 and a reference voltage Vref. When a voltage of the positive input end 111 is higher than a voltage of the negative input end 112, the output end 113 outputs the first voltage level, and the pulse width detection unit 120 reacts according to the first voltage level. It should be noted that the positive input end 111 may be directly connected to the phase end 15, but this disclosure is not limited thereto, the positive input end 111 may be indirectly connected to the phase end 15. In any manner of forming a negative correlation between the voltage of the positive input end 111 and the voltage of the phase end 15, such as through voltage division and even design, the objective of detecting whether the voltage of the phase end 15 exceeds the voltage limiting threshold can be achieved, which is known by persons of ordinary skill in the art and is not described in detail herein again.

In addition, the pulse width detection unit 120 must detect whether the input end thereof is at a first voltage level and remains the first voltage level for a time at least as long as a protection period. Persons of ordinary skill in the art may implement, by referring to the conventional art and according to an actual circuit specification, the pulse width detection unit 120 by using basic circuit units such as a logic gate, a delay circuit, and a one-shot circuit, which is not described in detail herein again.

For further description, for the over-voltage protection mechanism, By forming a large current on the channel of the upper bridge power switch 11, high-power consumption is caused, and the high-power consumption directly breaks the channel of the upper bridge power switch 11 and makes the channel disconnected, so that the phase end 15 is not coupled to an excessively high input voltage 12. For example, in FIG. 1, the switching voltage converting circuit 10 further includes a lower bridge power switch 16, and when the pulse width detection unit 120 outputs the over-voltage protection activation signal, a channel of the lower bridge power switch 16 is conducted and the channel of the lower bridge power switch 16 and the channel of the upper bridge power switch 11 form a current loop. The aforementioned current loop flows from the input voltage 12, directly through the channel of the upper bridge power switch 11 and the channel of the lower bridge power switch 16 separately, and then to a grounding end 17. Generally, on design, the upper bridge power switch 11 has a larger channel conduction resistance than the lower bridge power switch 16. Therefore, under same magnitude of channel current, the upper bridge power switch 11 consumes more power, and therefore, is more easily damaged than the lower bridge power switch 16, so that the phase end 15 is not coupled to the excessively high input voltage 12.

It can be known from FIG. 1 that, the switching voltage converting circuit 10 in FIG. 1 being a form of a buck switching voltage converting circuit is used as an embodiment for illustration. Therefore, when the over-voltage protection mechanism is activated to form a current loop, the current loop does not include the inductor 13. It should be noted that the switching voltage converting circuit 10 further includes a voltage converting controller 18, which is used to receive the over-voltage protection activation signal and an output end feedback signal of the voltage converting circuit, so as to determine control manners for the upper bridge power switch 11 and the lower bridge power switch 16 under various modes, and output a control signal.

Figure 2:
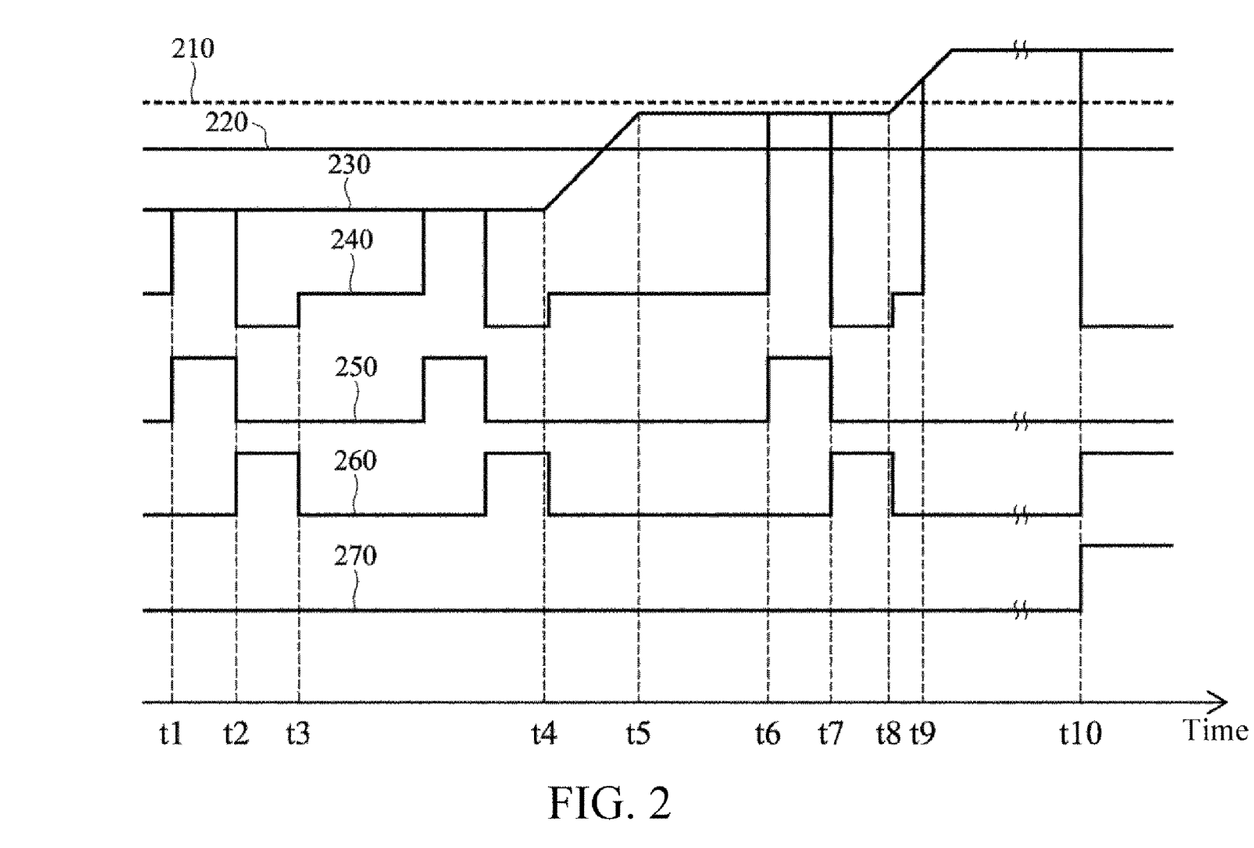
FIG. 2 is a relevant waveform diagram of an over-voltage protection circuit and a buck switching voltage converting circuit to which the over-voltage protection circuit is applied according to this disclosure.

FIG. 2 is a relevant waveform diagram of an over-voltage protection circuit 100 and a switching voltage converting circuit 10 to which the over-voltage protection circuit 100 is applied according to this disclosure. FIG. 2 shows a reaction behavior of the over-voltage protection circuit 100 in a case in which an excessively high voltage occurs in the input voltage 12 as the switching voltage converting circuit 10 manipulates under a pulse-skipping mode (PSM). In FIG. 2, a waveform 210 shows a level of an absolute maximal rating (AMR) of a withstand voltage of the upper bridge power switch 11, that is, when an end point voltage of the upper bridge power switch 11 exceeds the AMR, damage may be caused to the upper bridge power switch 11. A waveform 220 shows a level of a voltage limiting threshold. When a voltage of the phase end 15 remains higher than the voltage limiting threshold for too long, a supply voltage that is borne by a load circuit (not shown) driven by the switching voltage converting circuit 10 will become excessively high, and damage may be directly caused to the load circuit. A waveform 230 shows the input voltage 12, and a waveform 240 shows the voltage of the phase end 15. A waveform 250 shows a control signal for the upper bridge power switch 11. When the control signal is HIGH, a channel of the upper bridge power switch 11 is conducted; and otherwise, the channel is cut off. A waveform 260 shows a control signal for the lower bridge power switch 16. When the control signal is HIGH, a channel of the lower bridge power switch 16 is conducted; and otherwise, the channel is cut off. A waveform 270 shows an indication signal of the over-voltage protection activation signal.

For further description, at the time t1, as shown in the waveform 250, a signal turns into HIGH, and the channel of the upper bridge power switch 11 is conducted; as a result, as shown in the waveform 240, the voltage of the phase end 15 approaches an input voltage. At the time t2, as shown in the waveform 250 and in the waveform 260, the signal turns into LOW and HIGH respectively, and the channel of the upper bridge power switch 11 is cut off, while the channel of the lower bridge power switch 16 is conducted; as a result, as shown in the waveform 240, the voltage of the phase end 15 approaches a voltage of a grounding end 17. At the time t3, as shown in the waveform 260, the signal turns into LOW, and the channel of the lower bridge power switch 16 is cut off; as a result, as shown in the waveform 240, the voltage of the phase end 15 approaches an output voltage 14. At the time t4, the input voltage 12 begins to rise, and remains higher than the voltage limiting threshold at the time t5. At the time t6, as shown in the waveform 250, the signal turns into HIGH, and the channel of the upper bridge power switch 11 is conducted; as a result, as shown in the waveform 240, the voltage of the phase end 15 approaches the input voltage 12, that is, the voltage of the phase end 15 is higher than the voltage limiting threshold at this time. At the time t7, as shown in the waveform 250 and in the waveform 260, the signal turns into LOW and HIGH respectively, and the channel of the upper bridge power switch 11 is cut off, while the channel of the lower bridge power switch 16 is conducted; as a result, as shown in the waveform 240, the voltage of the phase end 15 approaches the voltage of the grounding end 17. Between the time t6 and the time t7, although the voltage of the phase end 15 is higher than the voltage limiting threshold, the over-voltage protection circuit 100 does not send an over-voltage protection activation signal because the duration during which the phase end remains higher than the voltage limiting threshold does not exceed a protection period.

At the time t8, the input voltage 12 begins to rise again, and exceeds the level of the AMR of the withstand voltage of the upper bridge power switch 11. At the time t9, because the upper bridge power switch 11 is already damaged, as shown in the waveform 250, even if the control signal for the upper bridge power switch 11 does not turn into HIGH, that is, even if the channel of the upper bridge power switch 11 is not controlled to be conducted, the channel of the upper bridge power switch 11 is still conducted directly. As a result, as shown in the waveform 240, the voltage of the phase end 15 approaches the input voltage, and afterwards, the voltage of the phase end 15 is continuously higher than the voltage limiting threshold. At the time t10, because the voltage of the phase end 15 has kept higher than the voltage limiting threshold and the duration begins to exceed the time length of a protection period, the over-voltage protection circuit 100 sends the over-voltage protection activation signal. As shown in the waveform 270, the signal turns into HIGH; as a result, the channel of the lower bridge power switch 16 is conducted. In this way, channels of the upper bridge power switch 11 and the lower bridge power switch 16 form a large-current loop, which further causes burnout of the upper bridge power switch 11 and makes the channel of the upper bridge power switch 11 disconnected; and the voltage of the phase end 15 is also restored to be lower than the voltage limiting threshold, thereby protecting the security of a rear-level load circuit.

Figure 3:
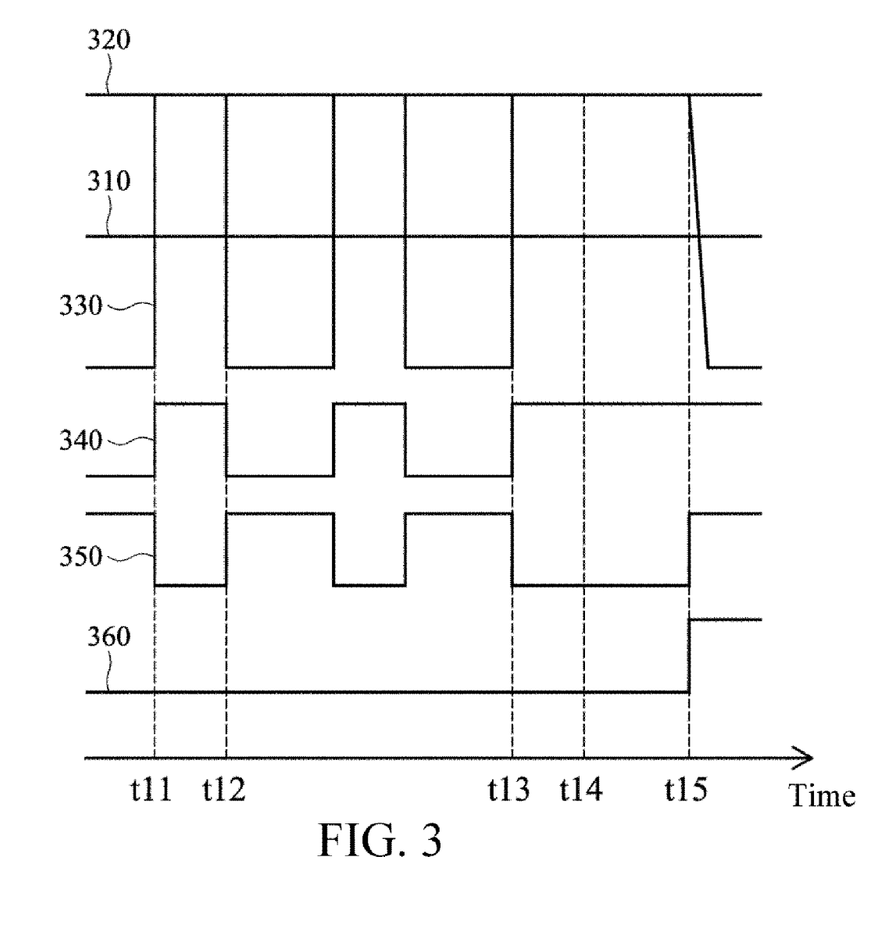
FIG. 3 is another relevant waveform diagram of an over-voltage protection circuit and a buck switching voltage converting circuit to which the over-voltage protection circuit is applied according to this disclosure.

FIG. 3 is a another relevant waveform diagram of an over-voltage protection circuit 100 and a switching voltage converting circuit 10 to which the over-voltage protection circuit 100 is applied according to this disclosure. FIG. 3 shows a reaction behavior of the over-voltage protection circuit 100 in a case in which, when the switching voltage converting circuit 10 manipulates under a continuous conduction mode (CCM), the channel of the upper bridge power switch 11 is continuously conducted as the control over the upper bridge power switch 11 has false operation. In FIG. 3, a waveform 310 shows a level of a voltage limiting threshold. A waveform 320 shows an input voltage 12. A waveform 330 shows a voltage of a phase end 15. A waveform 340 shows a control signal for the upper bridge power switch 11. A waveform 350 shows a control signal for the lower bridge power switch 16. A waveform 360 shows an indication signal of an over-voltage protection activation signal. It should be noted that, in FIG. 3, the input voltage 12 is higher than the voltage limiting threshold.

For further description, at the time t11, as shown in the waveform 340, a signal turns into HIGH, and the channel of the upper bridge power switch 11 is conducted; as a result, as shown in the waveform 330, the voltage of the phase end 15 approaches the input voltage 12, that is, the voltage of the phase end 15 is higher than the voltage limiting threshold at this time. At the time t12, as shown in the waveform 340 and in the waveform 350, the signal turns into LOW and HIGH respectively, and the channel of the upper bridge power switch 11 is cut off, while the channel of the lower bridge power switch 16 is conducted; as a result, as shown in the waveform 330, the voltage of the phase end 15 approaches a voltage of a grounding end 17. Between the time t11 and the time t12, although the voltage of the phase end 15 is higher than the voltage limiting threshold, the over-voltage protection circuit 100 does not send an over-voltage protection activation signal because the duration during which the voltage of the phase end remains higher than the voltage limiting threshold does not exceed the protection period.

At the time t13, as shown in the waveform 340, the signal turns into HIGH, and the channel of the upper bridge power switch 11 is conducted; as a result, as shown in the waveform 330, the voltage of the phase end 15 approaches the input voltage 12. However, at the time t14, as shown in the waveform 340, the signal does not turn into LOW, that is, false operation occurs in the control over the upper bridge power switch 11, which causes that the channel thereof is continuously conducted. The reason for the occurrence of the false operation may be damage of a voltage converting controller 18, which causes that the voltage converting controller 18 outputs an incorrect control signal; or the reason may be that a short circuit is suddenly formed between an control end of the upper bridge power switch 11 and another voltage, for example, metal shavings fall on a circuit board. At the time t15, because the voltage of the phase end 15 has kept higher than the voltage limiting threshold and the duration begins to exceed the time length of a protection period, the over-voltage protection circuit 100 sends the over-voltage protection activation signal. As shown in the waveform 270, the signal turns into HIGH, and the channel of the lower bridge power switch 16 is conducted. Therefore, channels of the upper bridge power switch 11 and the lower bridge power switch 16 form a large-current loop, which further causes burnout of the upper bridge power switch 11 and makes the channel of the upper bridge power switch 11 disconnected; and the voltage of the phase end 15 is also restored to be lower than the voltage limiting threshold, thereby protecting the security of a rear-level load circuit.

Figure 4:
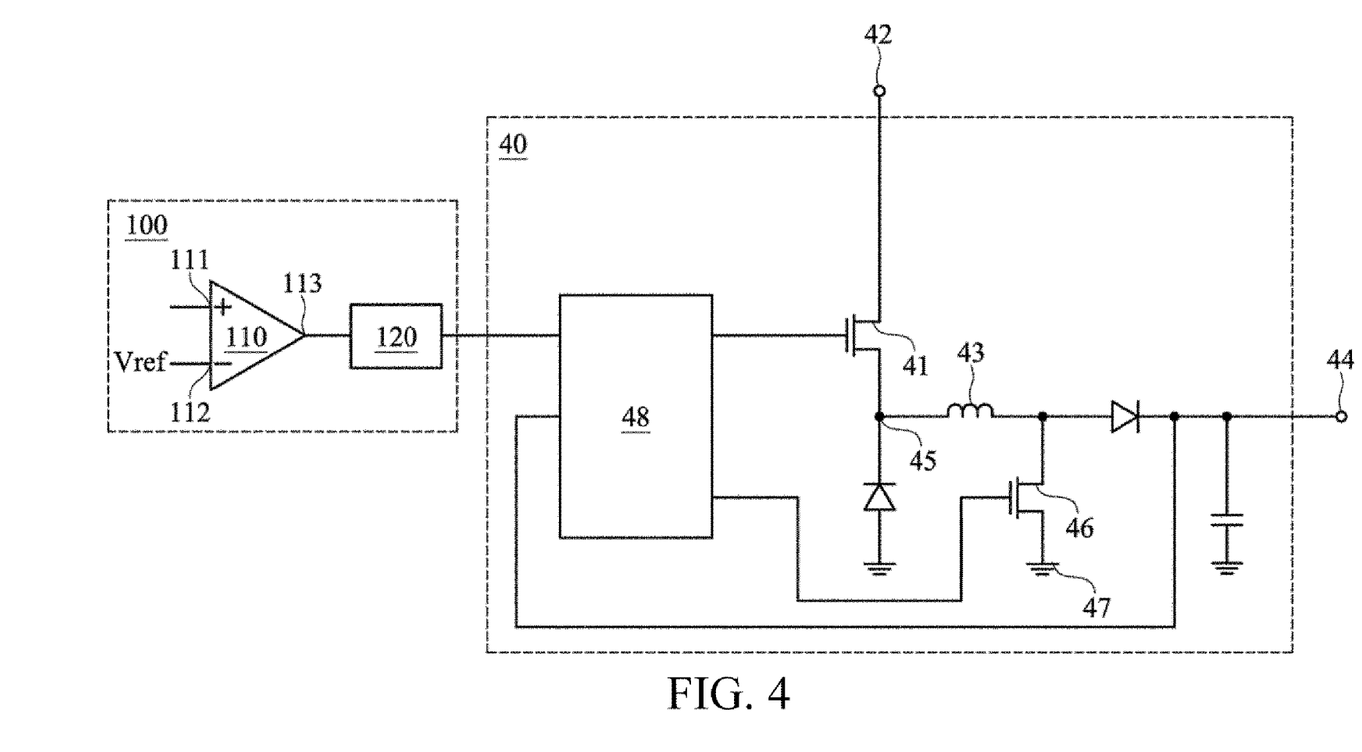
FIG. 4 is a circuit diagram of an over-voltage protection circuit and a boost-buck switching voltage converting circuit to which the over-voltage protection circuit is applied according to another embodiment of this disclosure.

FIG. 4 is a circuit diagram of an over-voltage protection circuit 100 and a switching voltage converting circuit 40 to which the over-voltage protection circuit 100 is applied according to another embodiment of this disclosure. The switching voltage converting circuit 40 manipulates an upper bridge power switch 41 in the circuit, so as to convert an input voltage 42 into an output voltage 44 through an inductor 43. A channel of the upper bridge power switch 41 and the inductor 43 are coupled to a phase end 45. The over-voltage protection circuit 100 includes a comparator 110 and a pulse width detection unit 120. For a circuit composition and an action manner of the over-voltage protection circuit 100, reference may be made to the relevant description in the embodiment shown in FIG. 1, so the details are not described herein again.

For further description, for the over-voltage protection mechanism, by forming a large current on the upper bridge power switch 11, the channel of the upper bridge power switch 11 is directly broken, to form an open circuit, so that the phase end 15 is not coupled to the excessively high input voltage 12. For example, in FIG. 4, the switching voltage converting circuit 40 may further include a lower bridge power switch 46, and when the over-voltage protection circuit 100 outputs an over-voltage protection activation signal, a channel of the lower bridge power switch 46 is conducted and the channel of the lower bridge power switch 46 and a channel of the upper bridge power switch 41 form a current loop. The aforementioned current loop flows from the input voltage 42, through channels of the upper bridge power switch 41, the inductor 43 and the lower bridge power switch 16 separately, and then to a grounding end 47. Generally, on design, the upper bridge power switch 41 has a larger channel conduction resistance than the lower bridge power switch 46. As a result, under same magnitude of channel current, the upper bridge power switch 41 consumes more power, and therefore is more easily damaged than the lower bridge power switch 46, so that the phase end 45 is not coupled to the excessively high input voltage 42.

It can be known from FIG. 4 that, the switching voltage converting circuit 40 in FIG. 4 being a form of a buck-boost switching voltage converting circuit is used as an embodiment for illustration. Therefore, when an over-voltage protection mechanism is activated to form a current loop, the current loop includes the inductor 43. It should be noted that the switching voltage converting circuit 40 further includes a voltage converting controller 48, which is used to receive the over-voltage protection activation signal and a feedback signal of a voltage converting loop, so as to determine control manners for the upper bridge power switch 41 and the lower bridge power switch 46 under various modes, and output a control signal.

Figure 5:
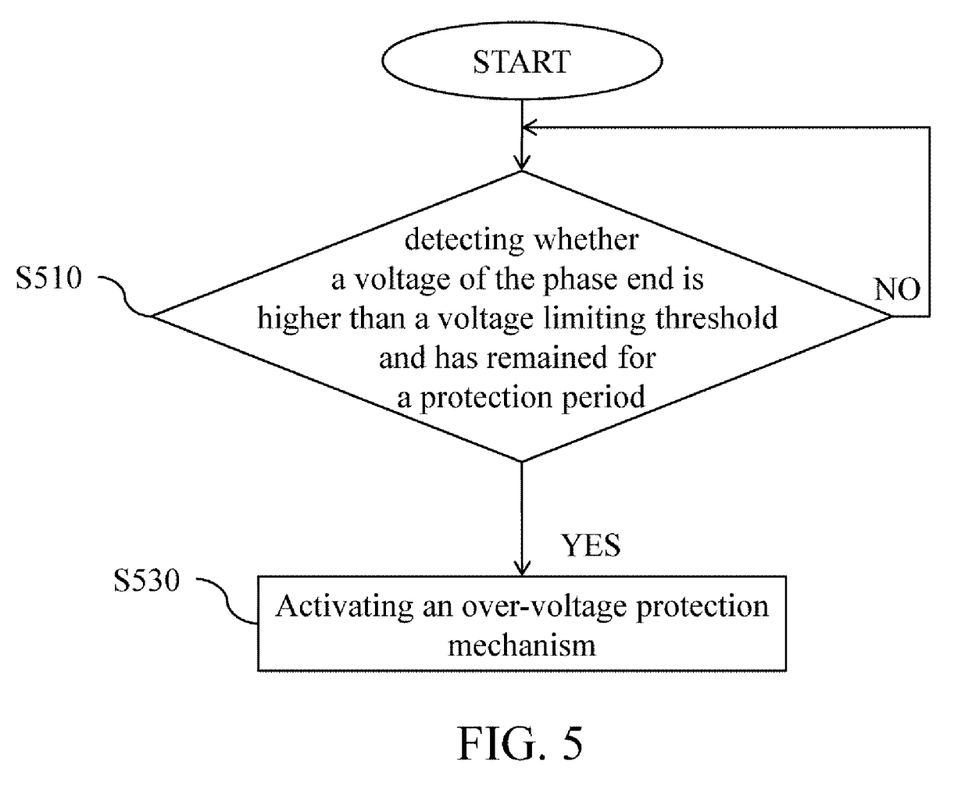
FIG. 5 is a flowchart of steps of an over-voltage protection method according to this disclosure.

FIG. 5 is a flowchart of steps of an over-voltage protection method according to this disclosure, which is applied to a switching voltage converting circuit, such as the switching voltage converting circuit 10 shown in FIG. 1. The switching voltage converting circuit 10 manipulates an upper bridge power switch 11 in the circuit, so as to convert an input voltage 12 into an output voltage 14 through an inductor 13. A channel of the upper bridge power switch 11 and the inductor 13 are coupled to a phase end 15. An over-voltage protection method includes the following steps.

As shown in Step S510, it is detected whether a voltage of the phase end 15 is higher than a voltage limiting threshold and has remains higher than the voltage limiting threshold for a protection period; and if yes, Step S530 is performed.

As shown in S530, an over-voltage protection mechanism is activated.

In another embodiment of the over-voltage protection method according to this disclosure, a step of detecting whether a voltage of the phase end 15 is higher than a voltage limiting threshold is comparing, by using a comparator, whether the voltage of the phase end 15 exceeds the voltage limiting threshold.

In still another embodiment of the over-voltage protection method according to this disclosure, the switching voltage converting circuit 10 further includes a lower bridge power switch 16, and the over-voltage protection mechanism refers to that a channel of the lower bridge power switch 16 is controlled to be conducted and the channel of the lower bridge power switch 16 and the channel of the upper bridge power switch 11 form a current loop. The current loop may not include the inductor 13 as shown in the buck switching voltage converting circuit of FIG. 1, or may also include the inductor 43 as shown in the buck-boost switching voltage converting circuit of FIG. 4, which is determined according to the form of the switching voltage converting circuit to which the over-voltage protection method is applied.

In yet another embodiment of the over-voltage protection method according to this disclosure, the over-voltage protection mechanism refers to that the input voltage 12 is turned off.

The embodiments of this disclosure have been disclosed above, but are not intended to limit this disclosure. Various variations can be made to shapes, constructions, characteristics, and quantities according to the application scope of this disclosure by persons skilled in the art without departing from the spirit and the scope of this disclosure. Therefore, the protection scope of this disclosure is subject to the scope of the appended claims.

What is claimed is:

1. An over-voltage protection circuit, applied to a switching voltage converting circuit, and used for detecting an abnormality of an upper bridge power switch in the switching voltage converting circuit, wherein the switching voltage converting circuit manipulates the upper bridge power switch, so as to convert an input voltage into an output voltage by an inductor, and a channel of the upper bridge power switch and the inductor are coupled to a phase end; comprising:

a comparator, coupled to the switching voltage converting circuit, wherein when a voltage of the phase end is higher than a voltage limiting threshold, an output end of the comparator outputs a first voltage level; and a pulse width detection unit, coupled to the output end of the comparator, wherein when the output end of the comparator remains the first voltage level for a time period longer than a protection period, the pulse width detection unit outputs an over-voltage protection activation signal;

wherein the switching voltage converting circuit further includes a lower bridge power switch, and when the pulse width detection unit outputs the over-voltage protection activation signal, a channel of the lower bridge power switch is conducted, and a current loop is formed between the channel of the upper bridge power switch and the channel of the lower bridge power switch.

2. The over-voltage protection circuit as claimed in claim 1, wherein the comparator includes a positive input end and a negative input end, the positive input end is coupled to the phase end, the negative input end is coupled to a reference voltage, and when a voltage of the positive input end is higher than a voltage of the negative input end, the output end of the comparator outputs a first voltage level.

3. The over-voltage protection circuit as claimed in claim 2, wherein the positive input end is directly coupled to the phase end.

4. The over-voltage protection circuit as claimed in claim 2, wherein the positive input end is indirectly coupled to the phase end.

5. The over-voltage protection circuit as claimed in claim 2, wherein when the pulse width detection unit outputs the over-voltage protection activation signal, the input voltage is turned off.

6. The over-voltage protection circuit as claimed in claim 1, wherein the current loop does not includes the inductor.

7. The over-voltage protection circuit as claimed in claim 1, wherein the current loop includes the inductor.

8. The over-voltage protection circuit as claimed in claim 1, wherein the switching voltage converting circuit is a form of a buck switching voltage converting circuit or a buck-boost switching voltage converting circuit.

9. The over-voltage protection circuit as claimed in claim 1, wherein when the pulse width detection unit outputs the over-voltage protection activation signal, the input voltage is turned off.

10. An over-voltage protection method, applied to a switching voltage converting circuit, and used for detecting an abnormality of an upper bridge power switch in the switching voltage converting circuit, wherein the switching voltage converting circuit manipulates the upper bridge power switch, so as to convert an input voltage into an output voltage by an inductor, and a channel of the upper bridge power switch and the inductor are coupled to a phase end; and the over-voltage protection method comprises the following steps:

detecting whether a voltage of the phase end is higher than a voltage limiting threshold and has kept higher than the voltage limiting threshold for a time as long as a protection period; and if yes, performing a next step; and activating an over-voltage protection mechanism;

wherein the switching voltage converting circuit further comprises a lower bridge power switch, and the over-voltage protection mechanism refers to that a channel of the lower bridge power switch is controlled to be conducted and a current loop is formed between the channel of the upper bridge power switch and the channel of the lower bridge power switch.

11. The over-voltage protection method as claimed in claim 10, wherein the step of detecting whether a voltage of the phase end is higher than a voltage limiting threshold is comparing, by using a comparator, whether the voltage of the phase end exceeds the voltage limiting threshold.

12. The over-voltage protection method as claimed in claim 11, wherein the over-voltage protection mechanism refers to that the input voltage is turned off.

13. The over-voltage protection method as claimed in claim 10, wherein the current loop does not includes the inductor.

14. The over-voltage protection method as claimed in claim 10, wherein the current loop comprises the inductor.

15. The over-voltage protection method as claimed in claim 10, wherein the switching voltage converting circuit is a form of a buck switching voltage converting circuit or a buck-boost switching voltage converting circuit.

16. The over-voltage protection method as claimed in claim 10, wherein the over-voltage protection mechanism refers to that the input voltage is turned off.

\* \* \* \* \*